United States Patent
Warnagiris et al.

(10) Patent No.: US 7,180,970 B1
(45) Date of Patent: Feb. 20, 2007

(54) AUTOMATIC LINK ESTABLISHMENT USING EXTERNAL SYNCHRONIZATION

(75) Inventors: Thomas L. Warnagiris, San Antonio, TX (US); Gary L. Ragsdale, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 513 days.

(21) Appl. No.: 10/090,328

(22) Filed: Mar. 4, 2002

Related U.S. Application Data

(60) Provisional application No. 60/272,902, filed on Mar. 2, 2001.

(51) Int. Cl.
*H04L 7/00* (2006.01)
(52) U.S. Cl. .................................................. 375/354
(58) Field of Classification Search ............... 375/354, 375/356, 219, 222; 370/503, 436–437; 379/93.01, 379/93.07, 93.05
See application file for complete search history.

(56) References Cited

U.S. PATENT DOCUMENTS

| | | | |
|---|---|---|---|
| 4,117,405 A | 9/1978 | Martinez | 325/58 |
| 4,937,822 A * | 6/1990 | Weddle et al. | 370/436 |
| 5,166,977 A * | 11/1992 | Ross | 380/243 |
| 5,420,831 A * | 5/1995 | Muirhead | 368/120 |
| 5,535,237 A * | 7/1996 | LaPadula et al. | 375/130 |
| 5,740,166 A * | 4/1998 | Ekemark et al. | 370/331 |
| 6,130,531 A * | 10/2000 | Hao | 324/85 |
| 6,269,055 B1 * | 7/2001 | Pikula et al. | 368/47 |
| 6,532,194 B2 * | 3/2003 | Aucsmith | 368/10 |
| 6,577,231 B2 * | 6/2003 | Litwin et al. | 340/310.01 |

* cited by examiner

*Primary Examiner*—Khanh Tran
(74) *Attorney, Agent, or Firm*—Baker Botts L.L.P.

(57) ABSTRACT

A system and method for synchronized communication of information between transmitting and receiving stations. The system has a first station and a second station, each attached to a modem, and a device, such as an automated link establishment controller, for establishing communications between the modems. The method involves establishing a selected communications channel between the modems and communicating data over the selected communications channel using coherent modulation synchronized by an external frequency reference without using a modem training interval.

12 Claims, 3 Drawing Sheets

AUTOMATIC LINK ESTABLISHMENT USING EXTERNAL SYNCHRONIZATION

RELATED PATENT APPLICATION

This application claims the benefit of U.S. Provisional Application No. 60/272,902, filed Mar. 2, 2001 and entitled "Automatic Link Establishment Using External Synchronization".

TECHNICAL FIELD OF THE INVENTION

This invention relates to synchronized communications systems and methods, and more particularly to synchronized communications systems and methods that eliminate modem training intervals during communications burst activity.

BACKGROUND OF THE INVENTION

HF (high frequency) radio, used today mostly in military applications, has various benefits. These include its low cost, its range, and its robustness. Its main disadvantage is that signal quality and propagation continually vary with time and location. Long distance communication using HF radios normally relies on ionospheric reflection of the signal, thus allowing beyond-line-of-sight communication. Unfortunately, ionospheric propagation is not consistent. Quality varies with operating frequency, location, signal direction, seasons of the year, and time of day. Distortion and interference can limit the effective rate of data transfer. Nevertheless, HF radio has appeal to users with long haul communications requirements but without access to satellite facilities.

Technological advances in HF modem design, Automatic Link Establishment (ALE) and frequency management have allowed automated HF systems to be built.

When multiple channels are available, ALE is a communications technique based on assigning an ALE adaptive controller the task of automatically controlling a high frequency (HF) receiver and transmitter in order to determine and establish the highest quality communications link with one or more HF radio stations. ALE automates the process of searching channels to find one that offers the optimum signal quality. In the majority of existing ALE HF systems, the participants in a communication net or link are assigned a common set of frequencies. The role of the automated system is to establish a useable link between participants on one of these frequencies.

In asynchronous ALE systems, radio receivers at different ends of the HF link scan round the common set of frequencies, stopping on each for a set period of time to determine if a link request is being made on that frequency. The different radios have no common knowledge of time, and hence scan round the frequency group asynchronously. When the ALE system wants to set up a link to another user, it selects a frequency from the predefined set and transmits a known calling sequence on that frequency to request a response from the intended destination. Due to the asynchronous nature of these systems, the transmission time for the call request needs to be long enough to ensure that the called station has sufficient time to scan round all the frequencies in the scan group. The calling station therefore transmits the calling sequence for a sufficiently long period and then, if a response is heard on the called frequency, it is assumed that the link is established. If no response is heard, the calling station chooses another frequency from the frequency group and continues with a new calling sequence until a frequency is found that can be used for link set up.

ALE systems may also use synchronous communications, which are conventionally implemented with internally generated synchronization signals. In one implementation, one station is designated as 'master' and the others synchronize to it. In operation, stations in a radio net scan round the common set of frequencies and listen on each frequency for a predetermined time for a call request. In this case the radio stations in the net are all scanning the same set of frequencies at the same time and, since the calling station knows what frequency the called station is listening on, link set up is faster and on-air time shorter than is the case with an asynchronous system.

Although ALE is a powerful communications technique, it suffers from high signal overhead, which reduces information throughput. Signal acquisition time, including modem training intervals, contributes to an inordinate amount of time spent setting up a communication channel for transmission of desired information. Most ALE systems use non-coherent rather than coherent modulation techniques, because of synchronization difficulties and the fact that coherent synchronization requires both frequency and phase synchronization.

SUMMARY OF THE INVENTION

The invention provides a system and method for synchronized communication of information between stations. The system and method operate to eliminate the modem training interval after establishing a selected communications channel between modems attached to the stations. Coherent modulation, along with the use of ALE protocols (selecting channels based on link quality analysis) provides high speed, reliable communications without the expense of internal synchronization circuitry. External frequency references can be derived from Global Positioning System (GPS) signals, double sideband residual carrier signals, 60 Kilo-Hertz carrier frequency signals broadcast by radio stations, or amplitude modulated (AM) broadcast signals such as those provided by AM radio stations.

The method includes the steps of establishing a selected communications channel between a modem in electronic communication with a first station and a modem in electronic communication with a second station. After the channel is established, information is communicated over the communications channel using coherent modulation synchronized by an external frequency reference. No training interval is utilized.

The system of the invention includes a first station having a first modem, a second station having a second modem, and a means for establishing the selected communications channel between the modems. The information is communicated between the modems using coherent modulation synchronized by an external frequency reference without using a training interval. The system may further utilize a means for scanning a plurality of channels including the selected communications channel, and a means for selecting the channel using the results of link quality analysis, such as an ALE controller.

DETAILED DESCRIPTION OF THE INVENTION

As indicated in the Background, although ALE is a powerful communications technique, it suffers from high signal overhead, which reduces its overall ability to rapidly transmit information. As mentioned previously, the (typically) high frequency propagation media can heavily distort the signal and cause frequent loss of signal. Thus, the advantageous mechanism of coherent demodulation is seldom used. As a solution to this problem, among the others mentioned above, coherent modulation, external frequency references, and ALE communication can be combined to increase data throughput, eliminate the modem training interval, and reduce the bandwidth required for acquiring a particular signal. SNR would also be improved at station phase-locked loop (PLL) and data detectors, since the noise bandwidth is reduced to a reduction in center frequency error. Thus, sounding times can be reduced, and higher levels of modulation can be implemented, along with narrower bandwidths, to provide equivalent data throughput. Also, narrower bandwidths are less susceptible to propagation distortion.

Figure 1:
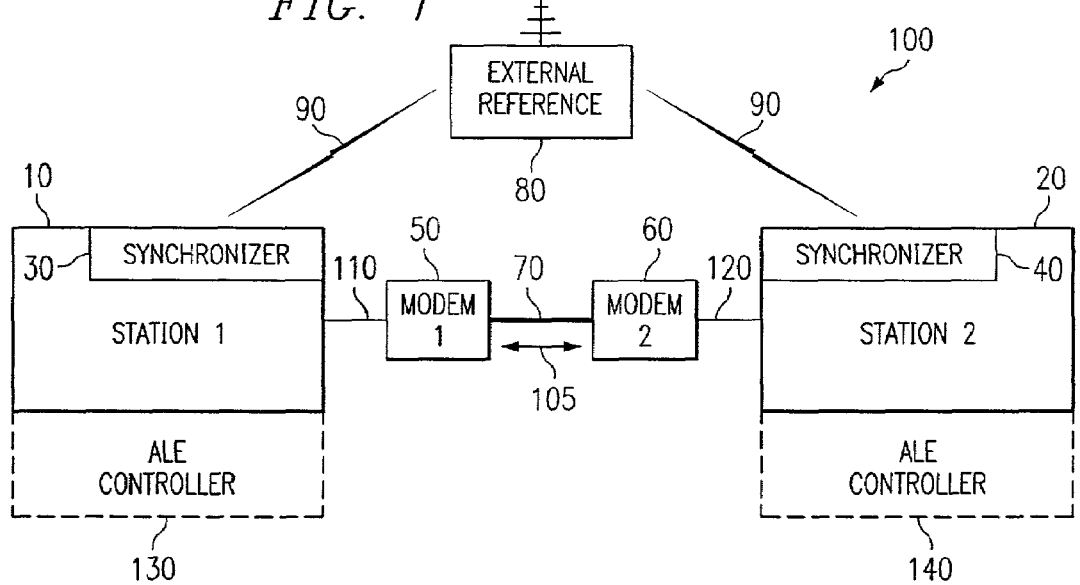
FIG. 1 is a block diagram illustrating the system of the invention.

FIG. 1 is a block diagram of the system of the present invention 100. The stations 10, 20 each have a transmitter and a receiver, a receiver and a transmitter, or a pair of transceivers, respectively. The stations 10,20 each have external synchronization circuitry 30, 40, respectively.

Station 10 is in electronic communication 110 via integral construction (or hardwire/wireless/optical communication) with modem 50. Similarly, station 20 is in electronic communication 120 with modem 60. The modems 50, 60 are in communication with each other over an established communications channel 70. It should be noted that the communication channel 70 may be hardwired, wireless, or optical fiber. Any means of transmitting information between the stations 10, 20, and more particularly, between modems 50, 60, may be used. Thus, the channel may be a physical channel (i.e., hardwired), or a virtual channel (i.e., packets sent over a global telecommunications network, such as the Internet).

The external reference signal 90 may be provided by one of several sources. For example, the Global Positioning System (GPS) provides a highly accurate time and frequency reference, available to most points on the earth. Alternatively, broadcasts from the National Institute of Standards and Technology (NIST) radio station WWVB, located near Fort Collins, Colo., can be used. Transmissions from WWVB are used by millions of people throughout the United States to synchronize consumer electronic products, such as wall clocks, clock radios, and wristwatches. The WWVB signal is also widely used for network time synchronization, and frequency calibration. The WWVB broadcast is continuous, at a frequency of 60 kHz. There is also a 60 kHz carrier frequency which can be used as an accurate frequency standard, referenced to the NIST Frequency Standard.

The accuracy of the WWVB signal is normally better than one part in 100 billion (i.e., $10^{11}$). Day-to-day deviations are less than five parts in 1,000 billion (i.e., $5 \times 10^{12}$). Binary coded decimal (BCD) time code can be received and used with an accuracy of approximately 0.1 milliseconds.

Thus, a standard reference signal, such as that provided by the GPS or WWVB systems, along with an ALE controller (such as the ALE controllers 130, 140 shown in FIG. 1 and in electronic communication with the stations 10, 20, respectively), can be used to produce carrier signals for time synchronization of transmitted data. At a remote receiver site, for example station 220, the same reference signal 90 can be used to establish the center frequency of the receiver, synchronize the data in time, and produce a carrier for coherent detection of the received signal.

Specialized GPS time and frequency reference receivers, such as the Hewlett Packard model 58503B, produce time and frequency signals by detecting and processing the GPS direct sequence spread spectrum signal. This is a viable method when the cost of the referenced receivers can be accommodated by the operators of stations 10, 20. However, when another signal common to the station 10, 20 sites is used as a reference (typically not intended to be used as a time and frequency reference signal), special processing may be necessary to remove modulation and noise from the signal, as is well known to those skilled in the art. Thus, DSB-RC signals not intended as time and frequency references, such as those provided by AM broadcast stations, NTSC television stations, etc., can be used to produce a frequency reference at frequencies other than their carrier frequency. This is easily accomplished by filtering and using a PLL to lock the resulting signal to a frequency offset by some division or multiplication of the carrier frequency. If absolute time synchronization is needed, a DSB-RC signal may require separate periodic time correlation, which can be provided by the WWVB signal, for example.

Conventional modems sharing a common channel do so by only transmitting and receiving information for limited periods of time. At other times, the modems relinquish the channel so that other stations may transfer information. Internally referenced modems lose synchronization during these quiescent periods. Therefore, conventional modems must resynchronize at the beginning of each channel acquisition. Useful data transfer time is lost during the resynchronization interval, called the "modem training interval." The training interval significantly reduces the data throughput of a shared channel, especially in systems where the average data transfer interval is relatively short (e.g., wireless Ethernet modems, or ALE systems). Synchronization to a continuous external reference 80 eliminates the Bandpass Limiter Phase Lock Loop (BLPL) training interval. Externally referenced modems can therefore devote a larger portion of channel acquisition time to data transfer, improving the effect of data throughput of the shared channel.

Thus, as illustrated in FIG. 1, the system 100 for synchronized communication of information without using a modem training interval comprises the first station 10, attached to, or in electronic communication with a first modem 50 and a second station 20, also attached to, or in electronic communication with a second modem 60. The system 100 also includes a means for establishing a selected communications channel 70 between the first modem 50 and the second modem 60, wherein information is communicated between the first and second modems 50, 60 using coherent modulation synchronized by an external frequency reference 80 without using a modem training interval.

Modulation, which depends on the use of a reference oscillator as a source for a carrier signal, is a method for matching a given information transfer to an available transmission medium. Modulation encodes base-band digital signals onto a carrier frequency centered within the media's transmission band. Demodulation reverses the process by extracting the base-band signal from the transmission band. While there are many modulation methods, they generally fall within two types: coherent and non-coherent modulation. Coherent modulation requires synchronization of both frequency and phase, but has certain advantages such as improved noise immunity. A feature of the invention is that it facilitates the use of coherent modulation. Although ALE systems using internal synchronization are capable of coherent modulation, the coherent modulation adds to the complexity of the system and system performance is not optimum.

The means for establishing a communications channel can include a means for scanning a plurality of channels including the selected channel, and a means for selecting the channel used for communication as a result of a Link Quality Analysis (LQA) to compare the plurality of channels with each other. The LQA may be conducted according to the requirements of MIL-STD-188 (i.e., MIL-STD-188-141A). An external reference 80 may be derived from a Global Positioning System (GPS) direct sequence spread spectrum signal, a double sideband residual carrier signal, a vestigial sideband residual carrier signal, a 60 kilohertz carrier frequency signal, a binary coded decimal time code, a signal broadcast by the National Institute of Standards and Technology (NIST) radio station WWVB, or an amplitude modulated broadcast signal. The means for establishing the selected communications channel, the means for scanning a plurality of channels, and the means for selecting the selected communications channel may all reside within, or be embodied by an ALE controller, such as a Harris RF-7210A Autolink II ALE controller.

ALE controllers can be found as external or as imbedded options in modern HF radio equipment. Link establishment is dependent on many factors and is fully optimized by programs executed within the ALE controller. ALE controllers function on the basic principles of Link Quality Analysis (LQA) and sounding. These tasks are accomplished using the following common elements: each controller has a pre-determined set of frequencies programmed into memory channels; channels are continuously scanned (typically at a rate of two channels per second); each controller has a pre-determined set of call signs programmed into memory which includes its own station call sign (Self), network call signs, group call signs, and individual call signs; ALE controllers transmit LQAs that "sound" the programmed frequencies for best link quality factors on a regular, automated, or operator-initiated basis; and when listening, ALE units log station call signs, frequencies heard on channel, and assign a ranking score relevant to the quality of the link on a per channel basis.

When a station desires to place a call, the ALE controller attempts to link to a remote station using the data collected during ALE sounding activities. If the remote station's data has not been collected by the sending ALE, the controller will seek the station and attempt to link using all programmed channels.

Upon successful link establishment, the station ALE controllers will cease the channel scanning process and alert the link operators that the system has established a connection and that stations should now exchange traffic. Upon completion of a link session, the ALE controllers will send a link termination command, and the ALE units will return to the scanning mode awaiting further traffic. Built-in safeguards insure that station ALE controllers will return to the scan mode in the event of loss-of-contact.

As well as being capable of LQA and optimum working frequency channel selection, modern ALE controllers are also capable of sending short (87 ASCII characters long) digital messages known as Automatic Message Display (AMD) to any or all members on the network. ALE controllers can contact individual stations by their call sign, all stations, or any stations on the network or group. Any and all calls can make use of wildcard characters in substitution for individual call signs, such as @?@ (ALL) and @@? (ANY). NULL Address Calls are used for system maintenance and are sent as @@@. ALE controllers conform to Military Standard (MIL-STD-188-141A) link establishment functions and perform encoding and decoding of data by the use of an 8-ARY binary FSK modulator/demodulator.

Figure 2:
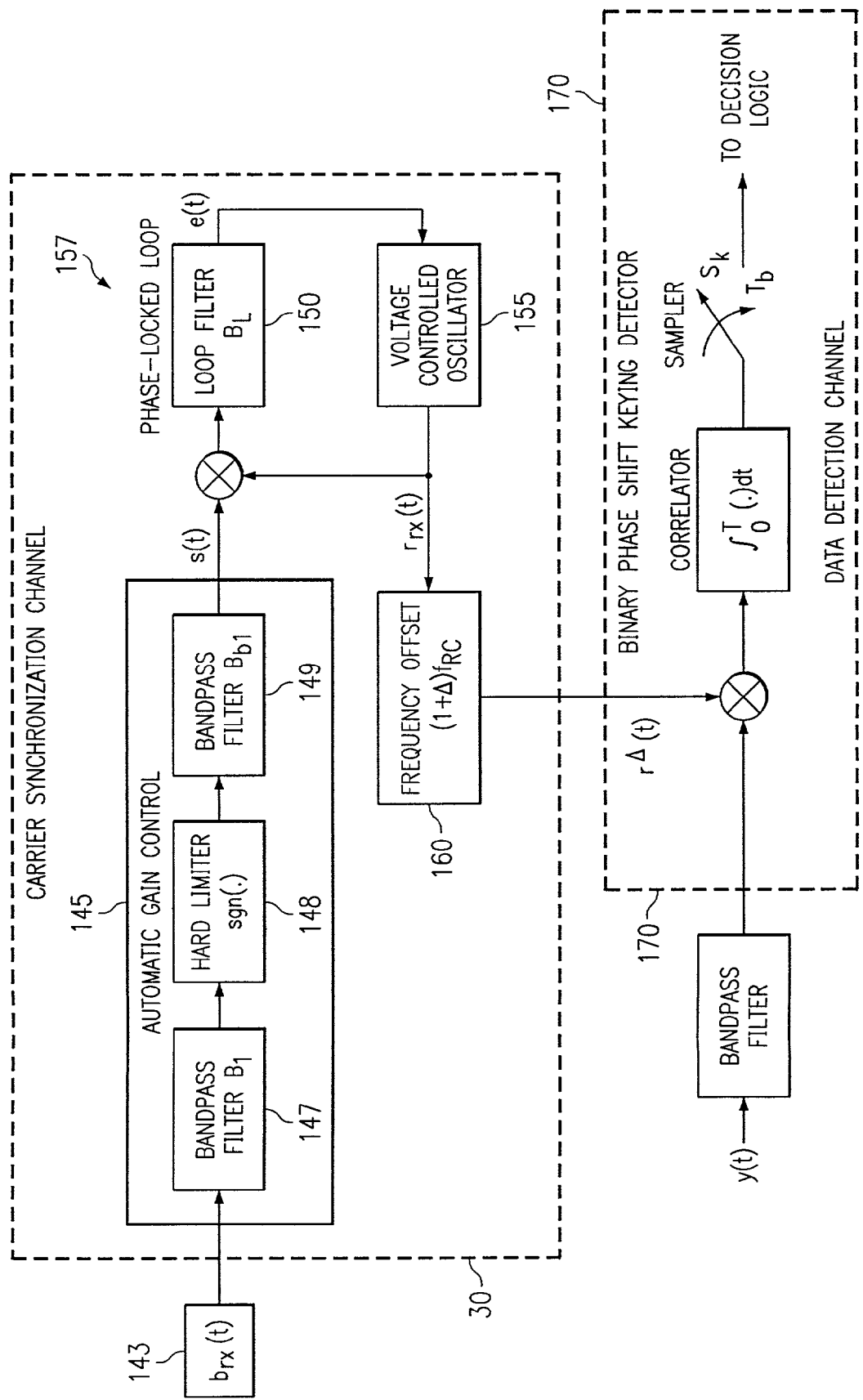
FIG. 2 is a block diagram of an externally synchronized receiver, which can be used in the system of FIG. 1.

FIG. 2 illustrates an example of receiver synchronization circuitry 30 which may be included in the stations 10, 20. The reference signal 143, after being received by the station 10, for example, is presented to the synchronization circuitry 30. In the receiver, the synchronization circuitry 30 may include automatic gain control circuitry 145, with a first band pass filter 147, a hard limiter 148, and a second band pass filter 149. The resulting gain-controlled signal is passed into a loop filter 150 and a voltage controlled oscillator 155, such that the result is fed back into the loop filter 150 as part of a phase-locked loop (PLL) 157. The output of the PLL 157 is thereafter offset by some selected amount in the frequency offset module 160, and the result is passed on to detection circuitry in the data detection channel 170.

Figure 3:
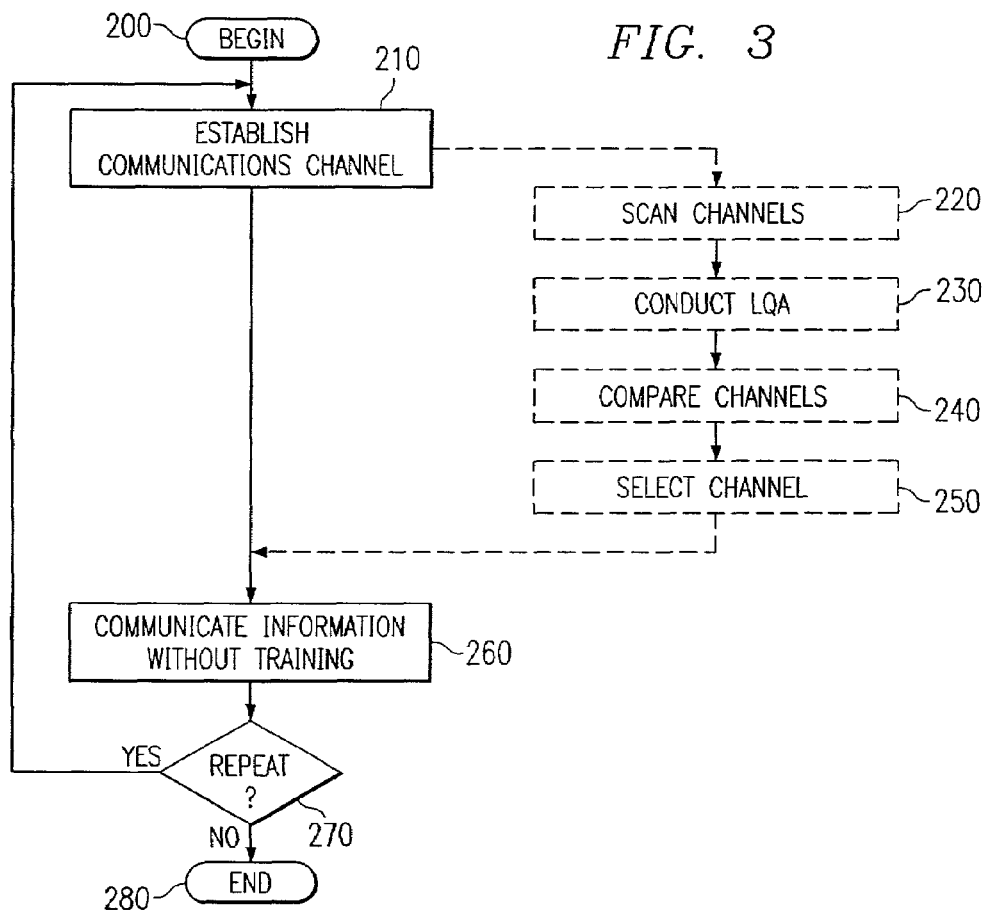
FIGS. 3 and 4 illustrate the method of the invention.
Figure 4:
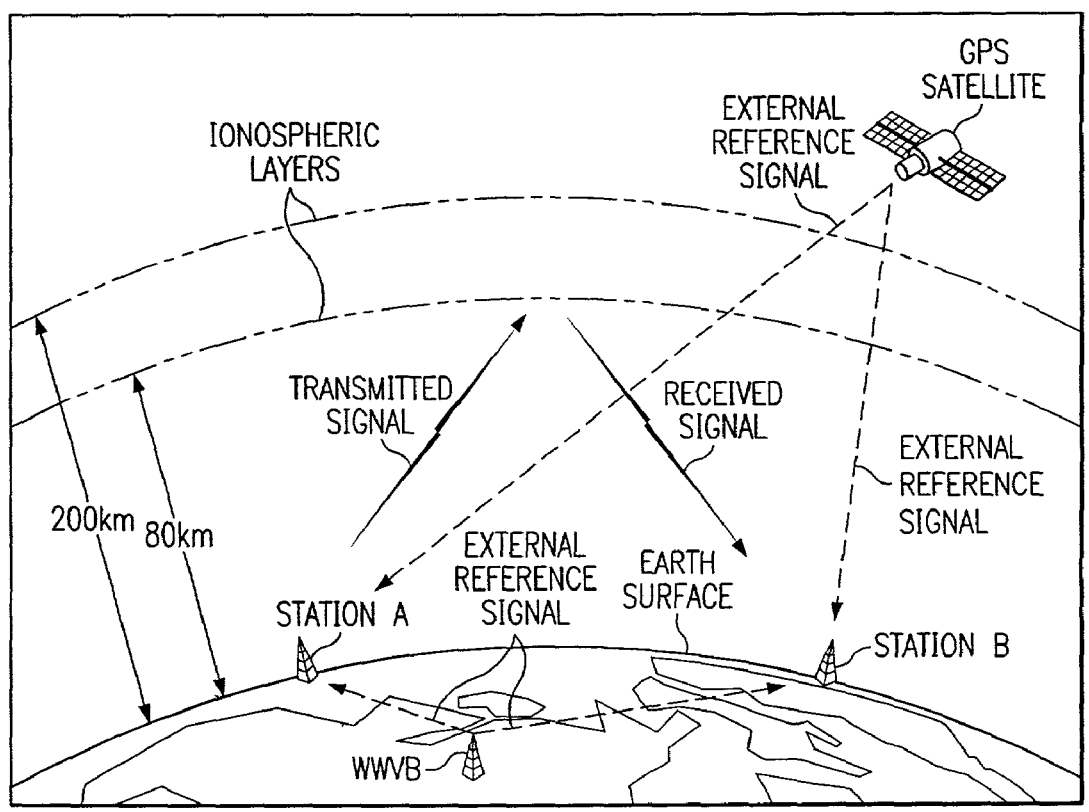

FIGS. 3 and 4 illustrate the method of the present invention. The method begins at step 200, and continues in step 210 with establishing the selected communications channel between a first modem and a second modem. The method continues with step 260, by communicating the information over the selected communications channel established between the first and second modems using coherent modulation synchronized by an external frequency reference, without using a training interval. Optionally, the step of establishing a selected communications channel may include the steps of scanning a plurality of channels including the selected channel in step 220, conducting a Link Quality Analysis (LQA) in step 230, comparing the plurality of channels using the results of the LQA in step 240, and selecting the best channel for establishing communications in step 250. Such activity may be partially defined in MIL-STD-188-141A, incorporated herein in its entirety by reference. The process of establishing a communications channel in step 210 and communicating information without a training interval in step 260 can be repeated if desired in step 270. Otherwise, the method ends at step 280. As mentioned previously, the external frequency reference may be derived from a GPS direct sequence spread spectrum signal, a DSB-RC signal, a vestigial sideband residual carrier (VSB-RC) signal, a binary coded decimal time code signal, a 60 kHz frequency signal broadcast by a NIST radio station, or an amplitude modulated (AM) broadcast signal.

The system and method of the present invention offers several significant advantages. Advantages include improved bandwidth efficiency by eliminating the dependence on internal references to support the accuracy of local oscillators. Currently, allowances must be made in the channel guard bands for any variations anticipated within the oscillator. Reducing guard band allocations comes at increased modem unit cost so that increasingly accurate local oscillators can be provided. The use of residual carrier broadcasts offer a source of highly stable external synchronization references. If necessary, an externally-synchronized design can include the construction of a residual carrier broadcast station with a highly accurate carrier reference source. Thus, the cost of the broadcast station can be a shared expense distributed among a large population of wireless modems. This broadcast station may serve as a ready-made reference to wireless modems, provided that the individual modems operate within the vicinity of the broadcast station, and that the accuracy of the broadcast is sufficient for the application requirements. In any event, externally referenced, wireless modems require much less bandwidth for guard bands than that required for conventional designs.

Communication link margins can also be improved by using a common frequency reference. Such a reference allows the link to be designed using coherent modulation with minimal circuitry. A common reference also eliminates carrier acquisition time upon initial signal acquisition, and minimizes the loss and/or corruption of data when the signal is lost, and then reacquired.

Circuit simplification is also an advantage to be derived from the present invention. A common reference can often be obtained by simple filtering and automatic gain control applied to existing commercial signals. There is no need for the conventional squaring circuit. Finally, while a PLL is used, its operation is not dependent on the SNR of the data transfer signal, as it would be with conventional carrier recovery circuits. Instead, a PLL as used in the present invention relies on the continuous broadcast of a DSB-RC reference signal, and the reference signal may be used regardless of whether it is received at a higher or lower SNR than the SNR of the information transmission signal.

The use of a BLPL and an external reference also lowers the cost of synchronization circuitry within many coherent transceiver applications. Internally referenced transceivers require more complex carrier tracking, frequency acquisition, and modem training circuitry. An external reference eliminates this complex circuitry. The reduced synchronization circuitry cost thus lowers the cost per unit of the transceiver.

By using a common frequency reference for the transmitter and receiver, the communication channel bandwidth can be reduced to that of the frequency error between the common reference signal as measured at the receive and transmit sites. For example, reference signals recovered from the NIST station WWVB can be expected to maintain an absolute stability of one part in $10^{11}$ (i.e., less than one Hertz at a carrier frequency of 100 GHz). The relative stability between the transmitter and receiver sites should be less than this amount, unless the received SNR of the reference signal is extremely poor.

Because a transmitter and its intended receiver are continuously synchronized to the same reference signal, there is no need for receiver carrier recovery circuits or data synchronization circuits to acquire the transmitted data signal. The transmitter and receiver will always be in time and frequency synchronization, even if there is no data being transmitted. When the signal path loss becomes severe, and the signal is lost, the transmitted signal will be immediately reacquired when the SNR again exceeds the receiver design threshold. Thus, no reacquisition delay will occur.

As noted above, the ALE protocol according to MIL-STD-188 may be used to establish voice or data links in the high frequency range of 2–32 MHz using signals bounced off of various layers of the ionosphere. The variable nature of the ionosphere and variable atmospheric noise levels in the HF range make it difficult to predict which frequencies will provide a viable link at any given time. By automating a search routine, transmitters and receivers can search for the best frequency and establish two-way links at optimal frequencies. However, in order for the search routine to be effective, the transmitter and receiver must track precisely in frequency and time. By using a common reference DSB-RC or GPS signal, it is possible to use narrower search bandwidths and shorter acknowledgement times.

Another application should also be noted. The system 100 of the present invention may be used with more than one common reference. Thus, a second external reference can be used as a backup to a first external reference. In this manner, even if the first reference fails, the second will continue to keep the transmitting/receiving stations synchronized. An offshoot of this application is realized in the area of meteor burst technology.

Meteor burst communications from one station to another make use of an ionized meteor trail detected by a probe signal. Once the probe is reflected from the ionized trail, it returns an acknowledgement to a receiving station indicating that a usable trail exists between the probe transmitter and the receiver. Once the usable trail is detected and its quality determined, a quantity of digitized data can then be transmitted in a high speed burst. However, handshaking uses up a considerable portion of the trail's useful lifetime, and takes place each time a burst of data is transmitted. Thus, data rate is sacrificed for increased reliability. By using coherent modulation techniques and external references, the signal acquisition time can be reduced, and the data throughput increased.

External synchronization can improve meteor scatter communications by eliminating the modem training interval and reducing the required bandwidth for signal acquisition. As mentioned previously, elimination of the training interval improves data throughput for each meteor burst transmission. A narrowed acquisition bandwidth, i.e., reduction in the error of the center frequency, reduces the noise bandwidth of the PLL and data detectors, which in turn improves the SNR at both the PLL and the data detectors.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method for synchronized high frequency communication of data between a first station having a first modem and a second station having a second modem, comprising the steps of:

synchronizing the communication using an external reference signal derived from a double sideband residual carrier signal not transmitted for the purpose of providing synchronization;

wherein the synchronizing step is performed by using a filter and phase locked loop to recover the carrier signal and mixing the recovered carrier signal with a frequency offset;

establishing a selected communications channel between the first modem and the second modem; and wherein the step of establishing a communications channel between the first modem and the second modem is performed by scanning a plurality of channels including the selected communications channel, and selecting the selected communications channel using the results of a Link Quality Analysis (LQA) to compare the plurality of channels;

communicating the information over the selected communications channel using coherent modulation without using a modem training interval.

2. The method of claim 1, wherein the LQA is conducted according to the requirements of MIL-STD-188-141A.

3. The method of claim 1, wherein the external reference signal is an amplitude modulated broadcast signal.

4. The method of claim 1, wherein the external reference signal is a broadcast television signal.

5. The method of claim 1, wherein the offset is obtained by multiplying or dividing the frequency of the reference signal.

6. The method of claim 1, wherein the external reference signal is used to establish a center frequency for the high frequency communication, to synchronize the data in time, and to provide a carrier for coherent detection of the data.

7. A system for receiving and decoding a high frequency communications signal without using a training interval, comprising:

synchronization circuitry for receiving an external reference signal derived from a double sideband residual carrier signal not transmitted for the purpose of providing synchronization;

wherein the synchronization circuitry has at least gain control circuitry, a phase locked loop, and a frequency offset generator;

an automatic link establishment (ALE) controller for establishing a selected communications channel between the first modem and the second modem, wherein the information is communicated between the first and second modems using coherent modulation synchronized by the external reference signal without using the modem training interval; and wherein the ALE controller is further operable to scan a plurality of channels including the selected communications channel and to select the selected communications channel using the results of a Link Quality Analysis (LQA) to compare the plurality of channels; and data detection circuitry for receiving a high frequency communications signal and for using the synchronization signal to decode data in the communications signal.

8. The system of claim 7, wherein the LQA is conducted according to the requirements of MIL-STD-188.

9. The system of claim 7, wherein the external reference signal is an amplitude modulated broadcast signal.

10. The system of claim 7, wherein the data detection circuitry uses PSK detection.

11. The system of claim 7, wherein the external reference signal is a broadcast television signal.

12. The system of claim 7, wherein the frequency offset generator is operable to multiply or divide the carrier frequency.

* * * * *